United States Patent [19]

Oetiker

[11] 4,067,238

[45] Jan. 10, 1978

[54] DEVICE FOR MEASURING THE RATE OF FLOW OF FLOWABLE PRODUCTS, PARTICULARLY LOOSE MATERIAL

[75] Inventor: Hans Oetiker, St. Gallen, Switzerland

[73] Assignee: Gebrüder Buhler AG, Switzerland

[21] Appl. No.: 663,917

[22] Filed: Mar. 4, 1976

[30] Foreign Application Priority Data

Mar. 5, 1975 Switzerland .................. 2691/75

[51] Int. Cl.² .......................... B67D 5/08; G01F 1/28
[52] U.S. Cl. ...................................... 73/228; 222/55
[58] Field of Search .............. 73/194 M, 228; 222/55, 222/57

[56] References Cited

U.S. PATENT DOCUMENTS

| 3,056,293 | 10/1962 | Ofner ................................. 73/228 |
| 3,212,330 | 10/1965 | DePollier .......................... 73/228 |
| 3,640,135 | 2/1972 | Tomiyaso et al. ................. 73/228 |

*Primary Examiner*—Herbert Goldstein
*Attorney, Agent, or Firm*—McGlew and Tuttle

[57] ABSTRACT

The device is of the type including a balance beam pivotally connected to a housing, an inclined measuring plate, adapted to deflect a product stream supplied in metered quantities and flowing off by gravity, mounted on the balance beam in a position in which its measuring surface extends substantially parallel to the longitudinal axis of the balance beam, and a mechanism in the housing, operatively associated with the lever arm of the balance beam remote from the measuring plate, and operable to act on such lever arm, in opposition to the effect of the deflecting force acting on the measuring plate, to produce a variable proportional to the time rate of the product flow and represented by a preferably pneumatic signal, resulting from oscillation of the balance beam about its position of equilibrium, this signal constituting the basis of either a measurement or a flow control derived from the signal.

16 Claims, 6 Drawing Figures

Fig.5

DEVICE FOR MEASURING THE RATE OF FLOW OF FLOWABLE PRODUCTS, PARTICULARLY LOOSE MATERIAL

FIELD AND BACKGROUND OF THE INVENTION

This invention relates to a device for measuring the rate of flow of flowable products, particularly loose material, comprising a balance beam pivoted to a housing, an inclined measuring plate, adapted to deflect the product flow supplied in metered quantities and discharged by gravity, mounted on the balance beam in a position in which its measuring surface extends substantially parallel to the longitudinal axis of the balance beam, and a mechanism provided in the housing and associated with the balance beam arm remote from the measuring plate and which is intended for acting on such balance beam arm in opposition to the effort of the deflecting force acting on the measuring plate, while a variable, proportional to the time rate of the product flow and represented, preferably, by a pneumatic signal resulting from the oscillation of the balance beam about the position of equilibrium thereof, constitutes the basis of the measurement or flow control derived therefrom.

In a first group of known devices of this kind, the action of force produced by the deflection of a product stream flowing over a measuring plate is utilized for determining the respective time rate of flow or controlling the same, by means of a measuring plate extending substantially parallel to the horizontal axis of the pivot. In some of these designs, the measuring plate is provided at one end of a balance beam centrally pivoted to a fixed support, and the measuring surface extends transversely to the longitudinal direction of the beam.

There are also known solutions in which the measuring plate itself is pivoted to a fixed support, oriented substantially parallel to the horizontally extending pivot axis and operationally connected to a device for measuring or controlling the product stream, by means of a transmission lever.

In both cases, the proportionality between the force acting on the device and the resultant variation of the time rate of flow of the product is affected by the fact that, due to the displacement of the point of application, on the measuring plate, of the resulting deflecting force, resulting from a variation of the weight rate of flow, the length of the lever arm for this force does not remain constant.

For eliminating the variations of the lever arm length, it has been proposed to provide a measuring plate with a measuring surface extending in the longitudinal direction of the balance beam carrying the plate. The design of the metering device mounted thereabove insures that, during variations of the weight rate of flow, the product stream which, considered in the longitudinal direction of the balance beam, flows symmetrically of its stationary centroidal axis, is increased or decreased.

Such an arrangement, based on the principle of a lever scale, comprises a balance beam swingable in a vertical plane. The axis of rotation of the balance beam pivot which consequently extends horizontally, permits utilizing only the vertical component of the resulting deflecting force at the measuring plate for the measurement.

In another device of this kind, the balance beam is mounted on a fixed support for oscillation about an axis which extends vertically. In this device, the balance beam can swing only horizontally so that only the horizontal component of the resulting deflecting force can be used for measuring.

However, experience has shown that, for the required accuracy of measurement of the control depending thereon, it is not sufficient merely to maintain the moment arm constant. The varying physical properties of the product, becoming manifest by a varying coefficient of friction, cause errors of measurement even with a constant volume flow.

It has been found that, on a measuring plate of any geometry, the lines of action of the deflecting forces, the resultants of which are of different magnitude and direction, depending on the different coefficients of friction of the products, do not necessarily intersect in a single point. The scatter of the point of application of the deflected forces on the measuring plate, caused by the varying friction factors, results in measuring errors even in cases where the measuring plate itself is mounted on a fixed support for swinging about a horizontally extending hinge axis, with the transmission of the measuring force to the measuring or control members by means of a lever arm varying with the friction coefficient of the product and in a vertical plane comprising the centroidal axis of the products stream and passing through the measuring surface in a direction normal to the hinge axis.

By using a balance beam carrying a measuring plate which is oriented in the longitudinal direction thereof, the transmission of the forces from the plate to the measuring or control members is transferred into a plane extending at a right angle to the plane containing the centroidal axis of the product in the arrangement with the measuring plate hinged directly to the support. This makes it possible to disregard a control, otherwise required by the varying friction factors, of the points of application of the respective deflecting forces on the measuring plate.

The length of the balance beam portion between the centroidal axis of the product stream, fixed by an appropriate design of the metering device, and the axis of rotation of the balance beam pivot remains constant, as a lever arm, for any deflecting force having its point of application situated in the plane which contains the centroidal axis of the product stream and which is normal to the longitudinal axis of the balance beam in its equilibrium position.

Due to such an arrangement, only one component of the respective deflecting force acting on the measuring plate is available for the measuring. As is well known, in the lever scale arrangements of the prior art, while utilizing the vertical or horizontal component of the resulting deflecting force, a deflecting torque is produced in the respective vertical or horizontal plane, depending on which of the two components is used as the measuring force to which the axis of rotation of the balance beam pivot is perpendicular.

In a device for utilizing the vertical component, with a constant flow volume, a deficit increasing with the coefficient of friction invalidates the actual time rate of flow.

In a device based on the measurement of the horizontal component, on the contrary, the effect of the same increase of the coefficient of friction is that, with the same unchanged flow volume, the actual time rate of flow is measured as increasingly diminishing with the increasing deficit.

Since, as a rule, the magnitude of the horizontal component is smaller than that of the vertical component, the relative influence of the friction is more important in the latter device.

SUMMARY OF THE INVENTION

The present invention is directed to a device, based on the lever-scale principle with a measuring plate aligned substantially in the longitudinal direction of the balance beam, in which the disturbing friction influence is eliminated.

In accordance with the invention, the pivot axis of the balance beam pivot extends in a first vertical plane which is normal to the longitudinal axis of the balance beam in its equilibrium position and parallel to the stationary centroidal axis of the product stream, and in a direction which is oblique relative to the line of intersection of this first plane with a second vertical plane including the longitudinal axis of the balance beam.

By providing the axis of rotation of the balance beam pivot in an oblique position between the horizontal and the vertical, it is possible to use that component of the respective resulting deflecting force acting on the measuring plate which is unaffected by the friction or other variations as the measuring force for determining the rate of flow or for effecting the control based thereon.

At a measuring plate extending longitudinally of the balance beam, it is admissible, without affecting the measuring result, to consider the deflecting forces, varying in magnitude and direction in accordance with different coefficients of friction of the product with respect to the surface of the measuring plate, as vectors which are effective in a common point of application relative to the pivot axis of the balance beam pivot.

The force vectors can be translated into a position parallel to the initial lines of action, within the plane which contains the centroidal axis of the product stream and is normal to the measuring plane as well as to the longitudinal axis of the balance beam in its position of equilibrium, into any fictive, common, point of application situated in the line of intersection of the measuring surface and the normal plane.

Such a resulting deflecting force can at any time be resolved into two components which are perpendicular to each other but, otherwise, of any direction. One, or even both, of these components may then be chosen as the measuring force, by correspondingly designing the device. In general, it is possible to determine the variations in magnitude of such a measuring force, obtained by the resolution of a resulting deflecting force, which necessarily follow the variations of the resultant caused by the variations of the friction coefficient of the product and may be larger or smaller, directed positively or negatively, depending on the choice of the direction for the resolution.

By splitting the respective resulting deflecting force into two mutually perpendicular components in accordance with the invention, i.e. so that one of them coincides with a straight line connecting the points of the vectors of the deflecting forces resulting from the different friction coefficients of the product and originating in a fictive point of application common to all the vectors, relative to the axis of the pivot, and the other component of which is perpendicular thereto, two specific measuring forces can be obtained which are optionally available for the measurement.

The first of the two components is influenced to the highest degree by the friction. The second component, on the contrary, is not influenced by the friction at all. Consequently, and advantageously for the solution of the problem underlying the invention, this second component becomes suitable for use since, in the fictive, common point of application relative to the axis of the joint, it remains the constant common component of the various deflecting forces of unequal direction and magnitude acting at this point as a result of the varying coefficients of friction of the product.

According to a development of the invention, the balance beam pivot may be designed so as to be angularly adjustable about the axis of the beam. This makes it possible to adjust an inclination of the axis of the pivot to the line of intersection of the two vertical planes, and in the first plane, such as to be able to use for the measurement, in each case, the component of the deflecting force which is unaffected by the friction. Tests have shown that the direction of this component as well as that of the other component passing through the points of the vectors of the deflecting forces having different directions and magnitudes depending on the coefficient of friction of the product, depends only on the geometry and inclination of the measuring plate.

For varying the inclination of the pivot axis, the balance beam may be designed, advantageously, as assembled of two detachably coupled parts of which the first part carries the measuring plate and the second part, which is connected to the pivot and angled by 90° relative to the first part, is operatively connected to a mechanism which is adapted to act on the balance beam in opposition to the deflecting force so as to return the beam each time into the position of equilibrium.

It is advisable to provide an arrangement in which the first part of the balance beam, along with the measuring plate, extends in a first housing or container means which is connected to the tube for supplying the product and which also may accommodate a metering device for the product, while the angled second part of the balance beam is received, along with the balance beam pivot and the mechanism acting on this part of the beam, in a second housing which is detachably secured to the stationary first housing and relative to which the axis of the pivot is fixed.

An angularly adjustable mounting of the second housing on the first housing makes it possible to change the angular position of the balance beam, i.e. of its pivot axis, and of the entire second housing relative to the non-rotatable first housing. A constant angle of inclination of the measuring plate may be insured by providing an also angularly adjustable mounting on the straight part of the balance beam.

To facilitate handling during transportation and assembly, it is recommendable to provide the coupling of the two parts of the balance beam between the measuring plate and the balance beam pivot, close to the latter.

For acting on the balance beam in opposition to the action of the deflecting force, a pivotally mounted auxiliary beam associated with and parallel to the angle part of the balance beam is advantageously provided in the angularly adjustable housing, and a force transmitting, edged, calibration member is provided which is longitudinally adjustable on the auxiliary beam and acts on the angle part of the balance beam at a point of application which is displaceable along this part.

Advantageously, a remotely controlled pressure transmitter, preferably a diaphragm, may be used as an actuator for acting upon the auxiliary beam through an angle lever. In this case, it is advantageous to secure the actuator to a carrier plate which is displaceable by means of a spindle mounted in the housing and to which also the angle lever may be pivoted. The, the point of application of the lever on the auxiliary beam can be displaced along the latter and along a scale which is associated with a pointer provided on the carrier plate.

For converting a deviation of the balance beam from its position of equilibrium, caused by the interaction between the deflecting force of the product stream and the counterforce of the actuator, into a pneumatic signal, a nozzle-baffle system known per se may be associated with the angle part of the balance beam. Advantageously, the control nozzle, which is connected to a pressure source and fixedly mounted in the angularly adjustable housing in front of a baffle which is carried by the angle part of the balance beam, is designed with a cross-section known per se, resulting in a rapid derivative action minimizing the amplitude of the balance beam oscillations about the position of equilibrium. Such a cross section of the nozzle orifice comprises, starting from the inlet of the nozzle, a throttling portion and then, suddenly enlarged, a wider portion extending up to the mouth of the nozzle. The pressure control port is provided immediately adjacent the sudden enlargement.

For determining the respective instantaneous time rate of flow of the products, the pressure-control port of the nozzle may be connected to a pressure transmitter designed, preferably, as a diaphragm, and to a suitably graduated indicator.

Due to the adjustable inclination of the axis of the pivot, any deflecting force component is evaluable, in principle, as a measuring force and the device in accordance with the invention may be used both for measuring and for a control of the rate of flow of flowable products based on the measurement.

With a combined use, for example, of two devices in accordance with the invention in series connection, any two components may be used simultaneously for specific processing purposes in mills. In such a case, one of the two devices may be adjusted to the component unaffected by the friction and, thus, determine the actual rate of flow. A comparison of this result with the other indication, which is intentionally directed to a component influenced by the friction to a known, predetermined, extent, and, advantageously, to the component representing the highest degree of influence, makes it possible to monitor the surface moisture of the granular product, which is of interest in grinding.

The two indicators connected to the measuring devices may advantageously be graduated in weight per time units.

In such an application, for a simultaneous evaluation of two components, preferably perpendicular to each other, and while using only one measuring plate and a single balance beam part carrying the same, the two measuring devices may be associated with each other at a right angle by means of a Cardan coupling and accommodated in a single housing. At the same time, of course, the axes of rotation of the pivots of both devices must lie in the same plane which is normal to the longitudinal axis of the straight balance beam part in its position of equilibrium.

Advantageously, the component unaffected by friction and that influenced to the highest degree may again be elected as the two components perpendicular to each other.

From two components determined in this manner, the magnitude and direction of the respective resulting deflecting force, which varies in accordance with the different coefficients of friction of the products, can be found out.

This space saving arrangement also offers the advantage that inaccuracies in measurement due to manufacturing tolerances of the component parts are eliminated.

In case the component unaffected by friction and that most influenced by friction are elected, the device adjusted to the component unaffected by friction and located upstream of the second device may be provided as a control device for the rate of flow, without an indicator. The coefficient of friction of the product is then directly readable on the indicator connected to measuring device located downstream.

A checking of the output of grinding is made possible by using two devices in accordance with the invention, adjusted to the component unaffected by friction, in which case one of the devices is provided in the product-supplying duct upstream of the first processing stage and the other device is provided downstream of the last processing stage. The device mounted upstream of the first processing stage may at the same time be used as a control device for the weight rate of flow of the plant.

It may be appropriate to associate the measuring device mounted downstream of the last processing stage with an indicator graduated in percents.

An object of the invention is to provide an improved device for measuring the rate of flow of flowable products, particularly loose material.

Another object of the invention is to provide such an improved device in which the disturbing friction influence is eliminated.

A further object of the invention is to provide such an improved device which may be used either for measuring the force determining the rate or flow or for effecting control of the flow based on measuring of the force.

For an understanding of the principles of the invention, reference is made to the following description of typical embodiments thereof as illustrated in the accompanying drawings.

DETAILED DESCRIPTION OF THE PREFERRED EMBODIMENTS

Figure 1:
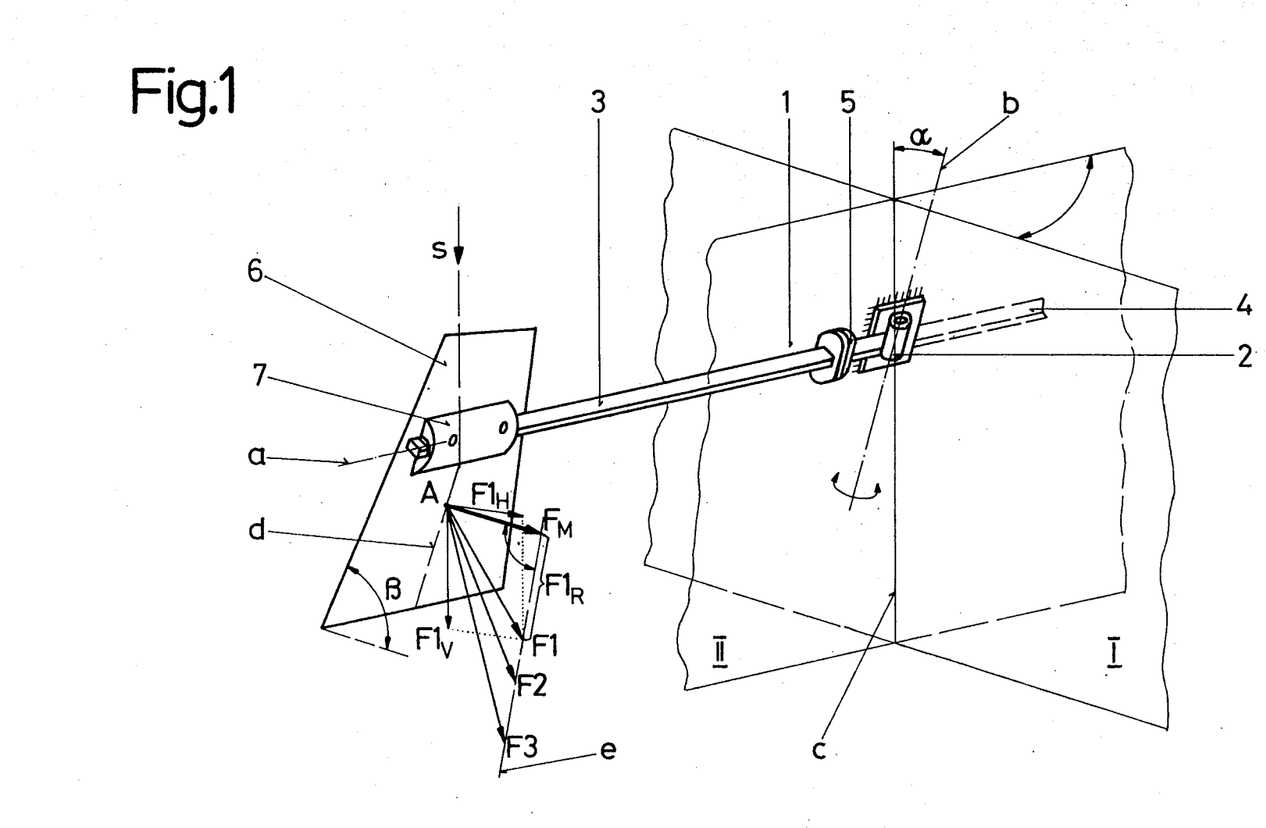
FIG. 1 is a perspective view showing the vectors of three deflecting forces resulting from different coefficients of friction of the product on the measuring plate and having a common, fictive, point of application, their common component unaffected by the friction, and the position of the axis of rotation of the balance beam pivot of a device in accordance with the invention, which axis extends in a plane normal to the balance beam in equilibrium.

FIG. 1 shows a balance beam 1 which is pivoted, by means of a pivot 2, to a housing (not shown) and is in its position of equilibrium. Balance beam 1 comprises two parts 3, 4 which are detachably connected to each other by means of a coupling 5.

At its end projecting into a metered supply stream of the product flowing off by gravity, balance beam part 3 carries a measuring plate 6 extending parallel to the longitudinal axis $a$ of balance beam 1. For securing measuring plate 6, a connecting member 7 is provided which is angularly adjustable about longitudinal axis $a$ of balance beam 1.

In FIG. 1, the main portion of part 4 of balance beam 1 is only partly indicated in dashed lines since, in this view, this part is covered by a vertical first plane I extending perpendicularly to longitudinal axis $a$ of balance beam 1 and containing the axis of rotation $b$ of pivot 2 of the balance beam. At the same time, plane I extends parallel to the centroidal axis $s$ of the flowing product stream.

The line of intersection $c$ of plane I with a vertical second plane II extending through longitudinal axis $a$ of balance beam 2 intersects the axis of rotation, or pivot axis, $b$ of pivot 2 centrally. Pivot axis $b$ forms an angle of inclination $\alpha$ with the line of intersection $c$ of the two mutually perpendicular vertical planes I, II. Measuring plate 6 forms an angle of inclination $\beta$ with the horizontal.

Vectors F1, F2, F3, taken arbitrarily, indicate the deflecting forces which, with an adjusted constant time rate of flow of the product, result from different coefficients of friction of the product on measuring plate 6. Force vectors F1, F2, F3, which differ from each other as to their magnitude and direction, act on measuring plate 6 at points of application which, in practice, are spaced apart along the line of intersection $d$ of the plane of the plate with a plane passing through centroidal axis $s$ of the product stream and containing vectors F1, F2, F3 and parallel to plane I which contains axis of rotation $b$ of balance beam pivot 2. However, the lever arm defined by the respective portion of balance beam 1 between the fixed axis of rotation $b$ and the also fixed, constant, centroidal axis $s$ remains constant for any resulting deflecting forces acting along line of intersection $d$. The torque exerted by these deflecting forces on axis of rotation $b$ of pivot 2 is not changed by the superposition of their points of application in a common, fictive, point of application.

In FIG. 1, the reference character A designates the fictive, common point of application of vectors F1, F2, F3, which is admissible with respect to pivotal axis $b$.

In a vertical plane containing all three vectors F1, F2, F3, force vector F1 is resolved into two mutually perpendicular components $F_M$ and $F1_R$. Component $F1_R$ extends along a straight line $e$ through the points of the three vectors F1, F2, 3 and represents the highest degree of influence by the coefficient of friction of the product.

The other component $F_M$, which is perpendicular to line $e$, is free from any frictional influence.

The horizontal and vertical components of force vector F1 are indicated by $F1_H$ and $F1_V$. Since the direction of both of these differs from that of component $F_M$ which is unaffected by friction, these two components are affected by the friction, the effect of the coefficient of friction on the horizontal component $F1_H$ being inverted as compared to the effect of the coefficient of friction on the vertical component $F1_V$.

In other words, during a measurement of the rate of flow based on the vertical component $F1_V$, the influence of the coefficient of friction of the product gives the appearance of a greater than actual deflecting force and, thus, a greater time rate of flow than in reality. Therefore, a volume governor adjusted to a constant weight rate of flow would throttle the flow in order to enable the counterforce to equilibrate the deflecting force.

With a measurement based on the horizontal component $F1_H$, on the contrary, the effect of the coefficient of friction appears as a reduced deflecting force which, with a volume governor adjusted to a constant flow, would result in an increased weight rate of flow.

The diagram of forces plotted at the back of measuring plate 6 which, besides, might also be entirely or partly curved, shows that the component $F_M$, which is free from frictional influence, remains the constant, common, component also for deflecting forces F2, F3 which are due to differing coefficients of friction of the product producing different resultants as to magnitude and direction. On the other hand, any deflecting force component having a direction deviating from that of $F_M$ is more or less influenced by the coefficient of friction of the product.

In order to make the component $F_M$, unaffected by the friction, available for the measurement or the control of the rate of flow based thereon, the angle of inclination of pivotal axis $b$ of balance beam pivot 2 relative to line of intersection $c$ of the two vertical planes I and II in plane I is adjusted so that the plane determined by pivotal axis $b$ and longitudinal axis $a$ of balance beam 1 becomes perpendicular to component $F_M$. The direction of component $F_M$ depends only on the geometry and inclination of measuring plate 6.

The adjustment may be effected by means of a calibration balance. As soon as this is done, the device remains unaffected by the coefficient of friction of the product or by the variations thereof.

Figure 2:
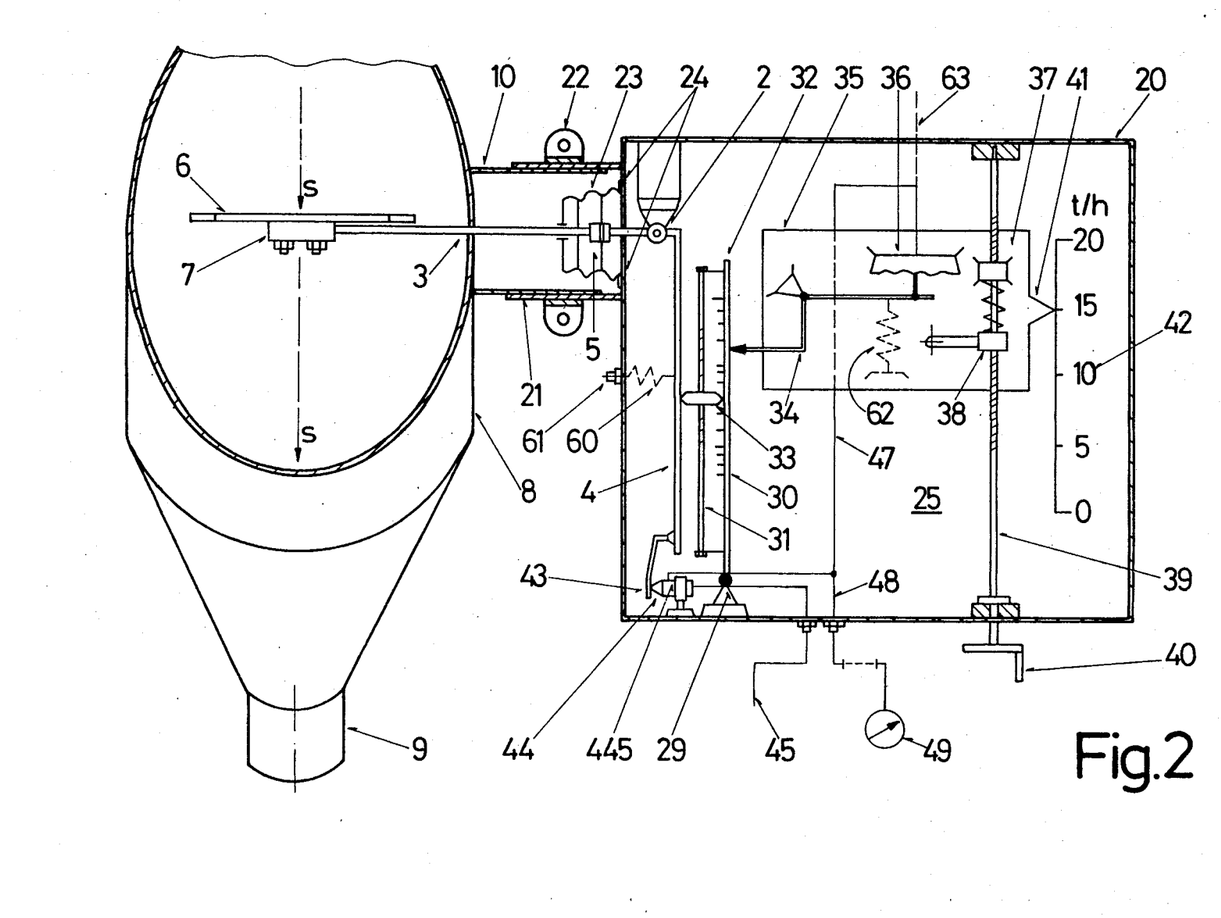
FIG. 2 is a sectional view of a complete measuring device in accordance with the invention, taken in a plane perpendicular to the pivot axis and parallel to the longitudinal axis of the balance beam as shown in FIG. 1, and a perspective view of the obliquely cut housing.

FIG. 2 shows how a measuring device in accordance with the invention is associated with a product stream to be checked.

A complete measuring device requires two housings 8, 20 which are held in assembled state by means of connecting parts 10, 21 22 provided thereon.

First housing or container means 8, into which the straight part 3 of balance beam 1 carrying measuring plate 6 secured by connecting member 7 projects, is fixedly mounted on a tube 9 through which the product stream is conveyed.

In FIG. 2, only the lower branch of tube 9 is visible, through which the product, after being deflected by measuring plate 6, is supplied to a processing machine or a bin. The centroidal axis $s$ of the product stream is indicated by a dashed line which, in this view, appears as a straight line.

As further shown in FIG. 2, at the right side of stationary first housing 8, a connecting piece 10 is provided through which the first straight balance beam part 3 can be introduced into the interior of housing 8.

Second housing 20, in which the second part 4, angled relative to the first part 3 by 90°, is also provided, at its left-hand side facing housing 8, with a connecting piece 21. Connection 21 is designed so that it can be slipped over connection 10 of first housing 8 and rotated, along with second housing 20, about connection 10 through any angle in the circumferential direction and fixed in the respective desired position by means of a lock 22.

First balance beam part 3 is surrounded by a bellows 23 which, for a dustproof closure of second housing 20 during operation, is fixed thereto after the two parts of coupling 5 have been connected, by means of suitable connecting elements 24.

In the angularly adjustable second housing 20, a mechanism 25 is provided for acting on balance beam 1 in opposition to the deflecting force acting on measuring plate 6 so that balance beam 1 can any time be returned again into its position of equilibrium.

In FIG. 2, adjustable second housing 20 is shown in a position angularly displaced relative to stationary first housing 8, which position has been adjusted in order to eliminate the influence of the coefficient of friction of the product.

That is why, in accordance with the chosen drawing plane for FIG. 1 which is perpendicular to the axis of rotation $b$ of balance beam pivot 2 and parallel to longitudinal axis $a$ of the beam, the diagrammatically shown mechanism 25, along with beam 1 and measuring plate 6, appear in orthogonal projection.

In adjustable housing 20, an auxiliary beam 30 is mounted, by means of a hinge 29, so as to extend parallel to the angle part 4 of balance beam 1. On a spindle 31 fixed to auxiliary beam 30, an edged calibration member 33 is provided and is displaceable along beam 30 and along a transmission ratio scale 32, and member 33 rests against angle part 4 at a variable point of application for transmitting an adjusted force from auxiliary beam 30 to balance beam 1. An angle lever 34 loads auxiliary beam 30 at a point of application which is displaceable along beam 30. Lever 34 is hinged to a carrier plate 35. An actuator, comprising a pressure transmitter designed as a diaphragm 36, is also mounted on carrier plate 35 and connected by force-closure to angle lever 34.

Carrier plate 35 is mounted, in a manner known per se, by means of two spring-loaded screw nuts 37, 38 connected thereto, on a spindle 39 which, in turn, is mounted in adjustable housing 20. Spindle 39 is provided with a hand wheel 40. Carrier plate 35 is equipped with a pointer 41 which, during a displacement of carrier plate 35 along with the actuator designed as diaphragm 36 and angle lever 34, glides along a scale 42 which is graduated in weight per time units.

A baffle plate 43, which is provided at that end of angled balance beam part 4 remote from pivot 2, is associated with a control nozzle 44 mounted in adjustable housing 20. Nozzle 44 is connected, through a line 45, to a source of compressed air (not shown). The pressure control port 445 of nozzle 44 is connected, through a line 47, to diaphragm 36 and, through a line 48, to an indicator 49.

Angle part 4 of balance beam 1 may be associated with a tare spring 60 which is anchored in adjustable housing 20 and provided with a tightening screw 61 for adjusting the spring force thereof, and angle lever 34 may additionally be associated with a load spring 62 having a constant spring force and attached to carrier plate 35. In this case, which will be explained later, instead of providing the pressure control connection through control port 445 of nozzle 44, diaphragm 36 is connected, through a line 63, to a remote control pressure source (not shown). Elements 60 to 63 are indicated in dashed lines.

Figure 3:
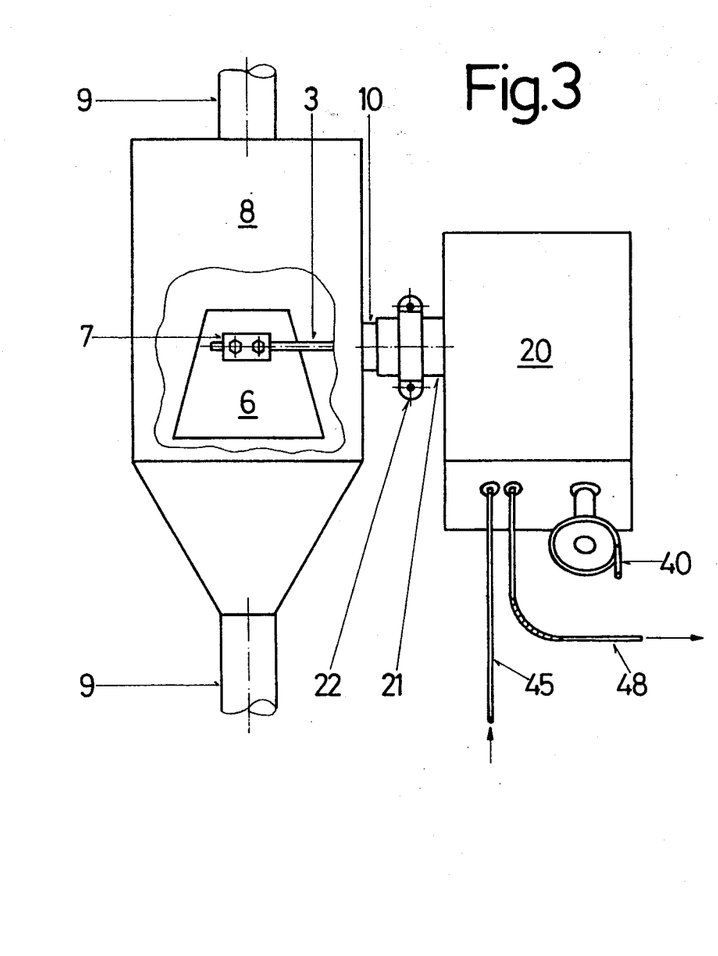
FIG. 3 is a front elevation view of a complete device in accordance with the invention, with a portion of the wall of the housing accommodating the measuring plate broken away for rendering the plate visible.

In FIG. 3, the device of FIG. 2 is shown in operative state. Corresponding parts are designated with the same reference numerals.

The drawing plane of FIG. 3 has been chosen so that first housing 8, which is connected to tube 9 conveying the product stream, appears, along with the tube, in orthogonal projection. The angularly adjustable second housing 20 is in an oblique position relative to the stationary first housing 8 and is held in this position by the lock 22 clamping the engaged connections 10, 21. Thereby, axis of rotation $b$ of balance beam pivot 2 is adjusted to the direction of deflecting force component $F_M$ which is unaffected by the coefficient of friction of the product (FIG. 1).

The broken-away portion of the wall of stationary housing 8 makes visible straight part 3 of balance beam 1 and measuring plate 6 secured thereto by means of connecting member 7.

At the bottom of angularly adjustable housing 20, pressure line 45 connecting to the compressed air source (not shown), line 48 leading to indicator 49, as well as hand wheel 40 of spindle 39 for carrier plate 35 are shown (see FIG. 2).

Figure 4:
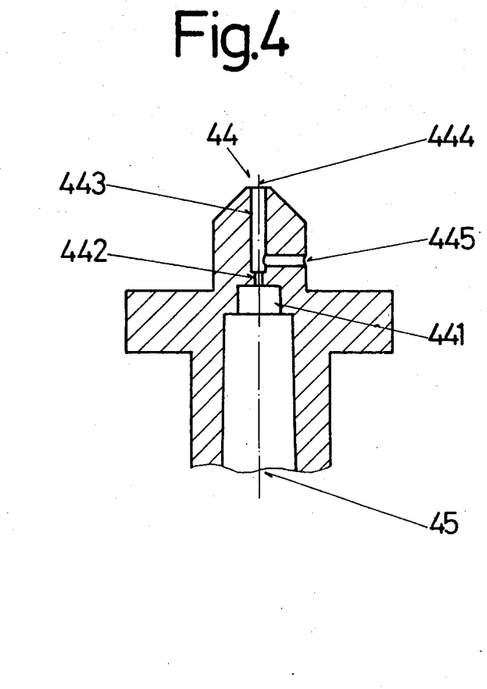
FIG. 4 is a sectional view of the control nozzle associated with the balance beam.

FIG. 4 shows control nozzle 44, which is provided for controlling the pressure of diaphragm 36 in accordance with FIG. 2, on an enlarged scale.

Inlet 441 of the nozzle orifice communicates with line 45 leading to a pressure source (not shown). Adjacent the inlet, a throttling portion 442 of the orifice is provided which is followed by a suddenly enlarged portion 443. The cross section of portion 443 is constant up to mouth 444 of the nozzle. Immediately adjacent the inner end of portion 443, control pressure port 445 is provided which is connected to diaphragm 36 and indicator 49 (see FIG. 2).

The device shown in FIGS. 1 to 4 operates as follows:

First balance beam part 3, which, usually, is transported separately, is coupled, initially without measuring plate 6, to angle part 4 of balance beam 1 and bellows 23 is connected in a dustproof manner, by means of connecting elements 24, to adjustable second housing 20.

Simultaneously with the engagement of connection 21 of adjustable housing 20 over connection 10 of stationary housing 8, first part 3 of balance beam 1 is introduced into the interior of stationary housing 8.

Angle of inclination $\alpha$ of pivotal axis $b$ of balance beam pivot 2 relative to line of intersection $c$ of the two vertical planes I, II is adjusted in plane I, by turning adjustable housing 20 along with balance beam 1, pivot 2 and mechanism 25, to a value which has been previously determined in a laboratory test in accordance with the geometry and the chosen inclination of the used measuring plate 6 and which, in many cases, is known from experience.

After tightening lock 22 and adjusting the chosen angle of inclination $\beta$ of measuring plate 6, any deviation of the rate of flow determined by the measuring device at a constant flow volume for different coefficients of friction of the product, from the actual rate of flow, which may occur due to the manufacturing tolerances of measuring plate 6, may be eliminated with the aid of a calibration balance by small corrections of angle of inclination α of pivot axis b. If the rate of flow measured by the measuring device appears greater than that measured by the calibration balance, angle of inclination α is to be reduced and, in the opposite case, increased. As soon as an angle of inclination α of axis of rotation b is obtained which makes it possible, with the given geometry of the measuring plate, to utilize component $F_M$ which is unaffected by the coefficient of friction of the product, the measured value indicated by indicator 49 will be equal to the value determined with the calibration balance. During the following operation, the coefficient of friction of the product or its variations will have no influence on the measured value.

The device in accordance with the invention is substantially suitable both as a volume governor and a pure measuring apparatus for the time rate of flow.

Advantageously, in the first case, scale 42 is graduated in percents (not shown in FIG. 2) and, in the second case, in weight per time units.

In case the device is used as a control device, of course, the nozzle-baffle control system 43, 44 associated with angled part or arm 4 of the balance beam will be designed with an oppositely directed effect and, because of this inversion, the tare spring 60, adjustable by means of tightening screw 61, will be provided.

In a measuring device according to FIG. 2, an increase in the deflecting force on measuring plate 6 due to an increased rate of flow has to effect a corresponding increase of the counterforce of diaphragm 36. When a control device adjusted to a constant rate of flow, on the contrary, the same increase in the deflecting force is to be eliminated by reducing the pressure acting in opposition to the effect of an increased flow volume on a product metering device of well known design.

Consequently, in a control device, pressure control port 445 of control nozzle 44 is connected only to the product metering device. A desired value of the rate of flow in a control operaation can be predetermined in percents by displacing the constant load on auxiliary lever 30 applied through angle lever 34 by additional spring 62. Then, a remote controlled variation of the desired rate of flow from a central control desk is made possible by means of diaphragm 36 to which a remote controllable pressure is applied through line 63.

The desired value in such a control device may also be varied individually, by displacing carrier plate 35 along percentage graduated scale 42 by means of hand wheel 40. In a control operation, indicator 49 becomes superfluous, of course.

In a control device, edged calibration member 33 serves to associate the required weight rate of flow to a desired value of the rate predetermined in percents. In a measuring device, the calibration member is needed for fixing the measuring range. The positioning of the calibration member is included in the single calibrating operation in which also inclination angle α of pivot axis b of the balance beam is adjusted.

The calibration of a control device comprises the following steps:

1. Adjusting the constant load, originating in spring 62 and transmitted to auxiliary beam 30 through angle lever 34, to the 100% mark of scale 42 which is graduated in percents and associated with pointer 41 of carrier plate 35;
2. positioning edged calibration member 33 at a definate value along transmission ratio scale 32 associated with auxiliary beam 30;
3. thereupon, effecting a stepwise calibration while using a calibration balance.

First, the time rate of flow of a dry product, corresponding to the positioning of calibration member 33, is read on the calibration balance.

Upon moistening the same product by means of a usually already provided device, the measuring is repeated with the moistened product (change of coefficient of friction) and with an unchanged position of calibration member 33.

In general, the second reading on the calibration balance will differ from the first one since, due to inaccuracies in the geometry and inclination of measuring plate 6, the initially adjusted angle of inclination α of pivot axis b will not correspond exactly to the direction of deflecting-force component $F_M$ which is unaffected by the varying coefficient of friction of the product. If the second value measured on the calibration balance is smaller than the first one, angle of inclination α is to be slightly reduced. In the opposite case, angle of inclination α is to be slightly increased.

Then, calibration member 33 also must be displaced until, in a new measuring with the moistened product, a third reading is obtained, on a calibration balance, corresponding to the first reading since, due to the readjustment of α, not only the influence of friction alone but also the magnitude, of the component originating in the pure deflecting force and just entering into the measurement, is changed. As soon as, in a next measurement with a dry product again, the third measured value is read on the calibration balance once more, angle of inclination α is adjusted to component $F_m$ unaffected by friction and calibration member 33 is in a position corresponding to the desired 100% rate of flow.

Should a fourth value be read on the calibration balance, differing from the third reading, the operations described for the second reading different from the first one are to be repeated analogously until, with an unchanged adjustment of angle of inclination α and calibration member 33, the same reading of the time rate of flow is obtained both with a dry product and with a moistened product.

If, for example, the position of calibration member 33 corresponds to a 100% rate of flow of 20 t/h, this rate must be maintained by the control device for a dry as well as a humid product, thus for any coefficient of friction of the productm without further intervention in the device.

If, later on, a rate of, for example, of 15 t/h is to be handled, carrier plate 35, with the actuators 62, 36 mounted thereon, is displaced along associated scale 42 to the 75% mark.

Aside from a displacement of carrier plate 35 along with spring 62, lever 34 and diaphragm 36 alongside percent scale 42, any change of the desired value during operation may be effected, by means of hand wheel 40, so that a pressure remotely controllable from a control desk is applied to diaphragm 36.

The calibration of a measuring device comprises the following steps:

1. Adjusting the load, produced by diaphragm 36 and transmitted through lever 34 to auxiliary beam 30, to a definite mark (for example, 20 t/h) by displacing carrier plate 35 along scale 42 which is associated with pointer 41 and graduated, in the present case, in weight per time units.

2. Carrying out a stepwise calibration in a manner similar to that with a control device, with the aid of a calibration balance, during which a constant flow volume (for example, 20 t/h) supplied from a metering device is measured with the initially adjusted angle of inclination.

First, with a dry product flowing therethrough, calibration member 33 is displaced until a percentage (for example 100%) corresponding to the value (for example 20 t/h) read on the calibration balance appears as an indication on indicator 49 which, in accordance with the measuring range of the measuring device, is graduated in percents.

If, in the next measurement repeated with the position of calibration member 33 unchanged but with a moistened product, the indication of percents of indicator 49 differs from the indication with a dry product, the operations which have been explained in connection with a control device are to be carried out analogously.

In a measuring device, the calibration steps must likewise be continued until, for any coefficient off friction of the product, without changing angle of inclination $\alpha$ or the position of calibration member 33, indicator 49 indicates a percentage (for example 100%) corresponding to the value (for example 20 t/h) read on the calibration balance.

In service, for monitoring rates of flow which differ from that (for example 20 t/h) used for the calibration, carrier plate 35 along with diaphragm 36 and lever 34 must be displaced, by means of spindle 39, so as to adjust pointer 41 to the respective desired mark of associated scale 42. For the displacement, hand wheel 40 or a remote controlled drive (see FIG. 6) may be used.

For changing the measuring range, calibration member 33 is to be displaced along the associated transmission ratio scale 32.

In a control device in accordance with the invention, the control range may be enlarged in an inexpensive manner by including a remotely controllable actuator in the form of a diaphragm 36 into mechanism 25 for loading balance beam 1 against the action of the deflecting force. Thereby, with the aid of a centrally controlled positive or negative pressure, the calibrated 100% rate of flow can be readjusted by the exactly same amount in the control devices of a mixing battery. This is often very advantageous in large processing and mixing plates.

Further, in a plant comprising such control devices, the adjustment of the desired value may also be made dependent on a technological quantity (filling level in the silo, temperature of the following dryer, etc.).

Figure 5:
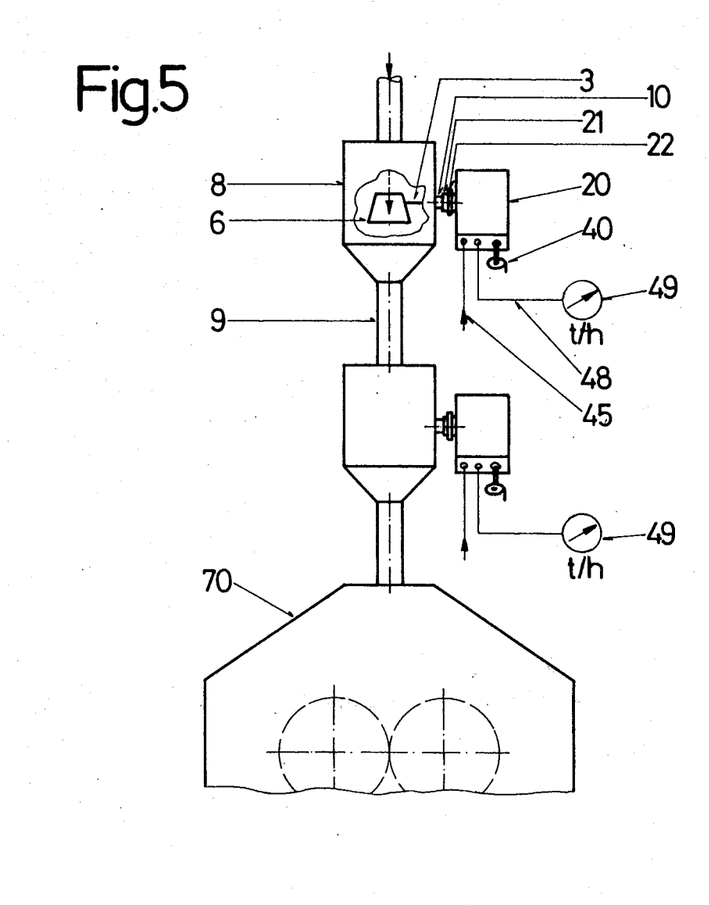
FIG. 5 is a front elevation view of a first example of use of the inventive devices in processing plants for granular products, where two of such measuring devices are series mounted in the supply stream of the product.

As shown in FIG. 5 two identical measuring devices according to FIGS. 1 to 4 are associated with tube 9 through which the product stream delivered in metered quantities from a storage (not shown) is conveyed to a roller mill 70. The same reference numerals are used for the corresponding parts. In the upper measuring device, angle of inclination $\alpha$ of pivot axis $b$ of balance beam pivot 2 is adjusted (not shown in FIG. 5) so as to pick up the component $F_M$ unaffected by friction of deflecting force F, as the measured force (see FIG. 1). Thus, the value indicated by the connected indicator 49 (upper) becomes a function of the actual rate of flow alone.

In the lower measuring device, axis of rotation $b$ is deflected by an angle of inclination $\alpha$ differing from that in the measuring device above. Because of this inclination, the measuring is based on another deflecting force component which is affected by friction and for which the degree of influence is determined in advance with the aid of a calibration balance.

Consequently, the resulting value indicated by lower indicator 49 is a function of the algebraic product rate of flow times coefficient of friction. In case a deflecting force component having a positive friction influence in accordance with the explanation to FIG. 1 is chosen, this algebraic product will always be greater than the actual rate of flow.

By forming a quotient of the pairs of associated values indicated on the two indicators 49 graduated in t/h, the respective instantaneous coefficient of friction of the supplied granular product can be determined and, thus, its superficial humidity may be continuously monitored.

While using a single measuring plate 6 and a single straight part 3 of the balance beam carrying the plate, the two devices could also be accommodated in a single housing, in which case the Pivotal axes $b$ of the respective pivots 2 extend perpendicularly to each other in the same plane I which is normal to longitudinal axis $a$ of the beam, and one of the pivots is connected to the housing and the other pivot is connected to the straight part of the balance beam, with both pivots being connected to each other by means of a cardan coupling having two degrees of freedom.

The first device located upstream (above in FIG. 5), which is adjusted to the component unaffected by the coefficient of friction of the product, may be provided in both cases as a control device for controlling the rate of flow, no indicator being necessary in such an arrangement, of course.

Figure 6:
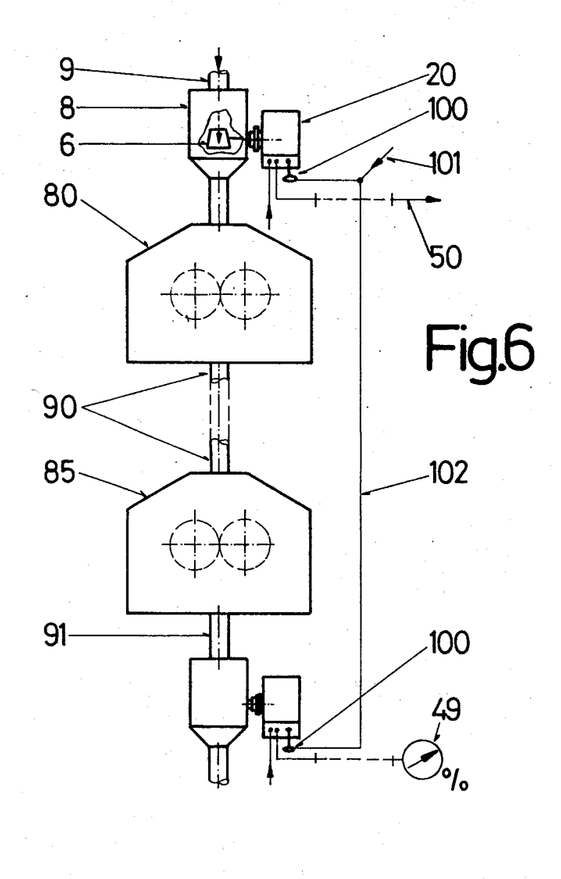
FIG. 6 is a view similar to FIG. 5 of another variant of use in which a control device is provided in the supply stream of the product flowing to a processing plant and a measuring device is provided in the product stream leaving the last processing stage of this plant.

FIG. 6 illustrates another possibility of application, for two devices in accordance with FIGS. 1 to 4, the same reference numerals being used for the parts.

The upper device, used as a controller, is again accommodated in tube 9 conveying the product to be ground to a roller mill 80 as the first grinding stage of a mill.

Having passed the first grinding state, the intermediate product is conveyed, through tube 90, to further processing and separating stages (not shown in FIG. 6) and reaches finally roller mill 85 as the last stage.

In a discharge tube 91 for the finished product of grinding, provided downstream of last roller mill 85, the lower device is used as a measuring device. The associated indicator 49 operates in a measuring range corresponding to the range of the desired value of the control device mounted upstream of the first grinding stage. The scale of the indicator is graduated in percents.

The adjustment of angle of inclination $\alpha$ of pivotal axis $b$ of balance beam pivots 2 in both of the devices corresponds to the angle of inclination of the upper device in FIG. 5 (see also FIG. 1). Due to the angles of inclination $\alpha$ chosen in this manner, each of the two devices picks up the deflecting force component which is unaffected by the coefficient of friction of the product.

A compressed air line 50 connects pressure control port 445 of control nozzle 44 (see FIG. 2) to a metering device of well known design which is received in tube 9 upstream of the control device.

Because of the separation of undesirable components from the ground product, a relatively small measured value, used as the desired value for the controller mounted upstream of first roller mill 80, always appears in the indicator 49 of the measuring device mounted downstream of the last roller mill 85. Consequently, the output of the product volume supplied per hour is any time readable in percents of the same.

For a synchronous remote adjustment of the desired value and the measuring range at the respective devices, each of the devices is equipped with a remotely controllable electric drive 100 for the respective spindle 39 of carrier plates 35 (see FIG. 5). Through corresponding electrical lines 101, 102, drives 100 are connected to a control device (not shown).

The connected indicators 49 according to FIG. 5 and 6 may also be accommodated in a central control room.

The possibilities of application of the inventive devices are in no way limited to the described examples. The invention may rather be used in a great variety of applications. The invention makes it possible to use the component unaffected by the coefficient of friction of the product of the resulting deflecting force inexpensively for measuring or controlling the time rate of flow of the product. If needed, for special measuring purposes or processing, the invention makes it also possible to utilize any deflecting force component affected by the friction and subjected to a determinable degree of influence.

While specific embodiments of the invention have been shown and described in detail to illustrate the application of the principles of the invention, it will be understood that the invention may be embodied otherwise without departing from such principles.

What is claimed is:

1. A device for measuring the rate of flow of a flowable material comprising means for containing a stream of flowable material, a balance beam adapted to extend into said container means, a measuring plate secured to said balance beam so as to be disposed in said stream of material flowing through said container means, said plate being mounted on said balance beam so that its measuring surface extends substantially parallel to the longitudinal axis of said balance beam, a housing mounted on said container means, said balance beam having an end portion extending into said housing, a pivot for said balance beam disposed in said housing, said pivot having a pivot axis extending in a first plane which is normal to a second plane containing the longitudinal axis of said balance beam in the position of equilibrium of said balance beam, and which first plane is parallel to a stationary centroidal axis of said stream of flowable material, and such pivot having its axis obliquely disposed relative to the intersection of said first and second planes, and a mechanism disposed in said housing operatively associated with said balance beam to act on said balance beam in opposition to the deflecting forces acting on said measuring plate.

2. In a device for measuring the rate of flow of flowable products, the improvement claimed in claim 1, in which said balance beam comprises first and second disengageable coupled parts; said first part carrying said measuring plate and said second part being connected to said balance beam pivot and extending at an angle of 90° relative to said first part; said second part constituting a lever arm of the balance beam operatively associated with said mechanism.

3. In a device for measuring the rate of flow of flowable products, the improvement claimed in claim 2, in which said first and second parts of said balance beam are interconnected by a coupling between said measuring plate and said balance beam pivot and adjacent said balance beam pivot.

4. In a device for measuring the rate of flow of flowable products, the improvement claimed in claim 2, in which said mechanism comprises elements positioned in said housing and operatively associated with said second balance beam part, said elements including, in combination, an auxiliary beam pivotally mounted in said housing and extending parallel to the angled part of said second balance beam part; a force-transmitting edged calibration member positioned alongside said auxiliary beam and engageable with said second balance beam part, said calibration member being adjustable longitudinally of said second balance beam part to a selected point of application thereagainst; an actuator comprising at least one remotely controllable pressure transmitter designed as a diaphragm; a carrier plate supporting said actuator; a spindle rotatably mounted in said second housing and engageable with said carrier plate to displace said carrier plate; a double angle lever pivotally mounted on said carrier plate and having one end connected to said actuator and the opposite end engaging said auxiliary beam; the displacement of said opposite end of said double angle lever along said auxiliary beam being effected by displacement of said carrier plate; a pointer on said carrier plate; and a scale cooperable with said pointer to indicate the displacement of the point of engagement of said double angle lever with said auxiliary beam.

5. In a device for measuring the rate of flow of flowable products, the improvement claimed in claim 4, including a baffle plate carried by said second balance beam part; a control nozzle cooperating with said baffle plate and secured in said housing; a line, leading from a source of pressure, connected to said control nozzle; said control nozzle having an orifice including, in sequence from the nozzle inlet, a throttling portion and a suddenly enlarged portion having a constant cross section up to the nozzle discharge mouth; a pressure control port communicating with said orifice adjacent the inner end of said suddenly enlarged portion; and means connecting said pressure control port to said remotely controllable pressure transmitter and to an indicator.

6. In a device for measuring the rate of flow of flowable products, the improvement claimed in claim 5, including a load spring secured on said carrier plate and connected to said double angle lever; said load spring serving, in addition to said diaphragm, as an actuator; and a line, connected to a source of remotely controllable pressure, pressure-connected to said diaphragm; said pressure-controlled port of said control nozzle being pressure-connected to a metering device.

7. In a device for measuring the rate of flow of flowable products, the improvement claimed in claim 2, in which said first balance beam part is rectilinear and, along with said measuring plate, extends in a container means for the product; said second balance beam part, together with said mechanism operatively associated therewith and said balance beam pivot being positioned within said housing disengageably secured to said container mean; said pivot axis of said balance beam pivot being fixed relative to said housing.

8. In a device for measuring the rate of flow of flowable products, the improvement claimed in claim 7, in which said housing is disengageably secured to said container means for angular adjustment relative to said container means; said measuring plate being secured to said first balance beam part for angular adjustment relative thereto.

9. In a device for measuring the rate of flow of flowable products defined in claim 1 and including means for adjusting the angle of inclination of said pivot axis in said first plane relative to the line of intersection between said first and second planes.

10. In a device for measuring the rate of flow of flowable products, the improvement claimed in claim 1, and including means for selectively using said device as a measuring device or as a control device which selectively continuously suppresses or continuously evaluates the influence of the coefficient of friction of the product, with respect to the surface of the measuring plate which coefficient of friction varies with the physical properties of the product.

11. In a device for measuring the rate of flow of flowable products, the improvement claimed in claim 10, including a second device similar to said first mentioned device connected in series in said container means through which the product stream is supplied to a processing plant; one of said measuring devices being adjusted to the component of the deflecting force unaffected by friction; the other said device being adjusted to a respective component of the deflecting force affected by a predetermined friction.

12. In a device for measuring the rate of flow of flowable products, the improvement claimed in claim 11, in which each measuring device is associated with an indicator calibrated in weight-per-time units.

13. In a device for measuring the rate of flow of flowable products, the improvement claimed in claim 10, and including a second measuring device similar to said first mentioned device connected in series in said container means supplying the product stream; said two similar measuring devices functioning, according to the flow direction, as an upstream control device and a downstream measuring device; said control device being adjustable to the component of the deflecting force which is unaffected by friction; said measuring device being adjusted to the component of the deflecting force affected by friction to the highest degree.

14. In a device for measuring the rate of flow of flowable products, the improvement claimed in claim 10, including a second measuring device connected in series in said container tube through which the product stream is applied; said two measuring devices having a single common measuring plate and a single common first balance beam part carrying said single common measuring plate, and being accommodated in a single housing; said two measuring devices having respective balance beam pivot axes extending perpendicular to each other in said first plane; and a constituting Cardan coupling, having two degrees of freedom, interconnecting said two respective balance beam pivot axes.

15. In a device for measuring the rate of flow of flowable products, the improvement claimed in claim 10, including a second measuring device, one of said measuring devices serving as a control device and disposed in a product stream supplied through said container means to the first processing stage of a multi-stage processing plant; and the second of said measuring devices disposed in at least one product stream leaving the last processing stage of said plant; both said devices being adjusted to that component of the deflecting force unaffected by friction.

16. In a device for measuring the rate of flow of flowable products, the improvement claimed in claim 15, including an indicator connected to the measuring device disposed in the product stream leaving the last processing stage; said indicator being calibrated in percents and having a measuring range which is remote-adjustable in parallel with the adjustment of the set point in said control device disposed in the product stream supplied to the first processing stage.

* * * * *